July 8, 1952      A. R. DAVIDSON      2,602,586
QUALITY CONTROL INDICATOR
Filed June 13, 1950
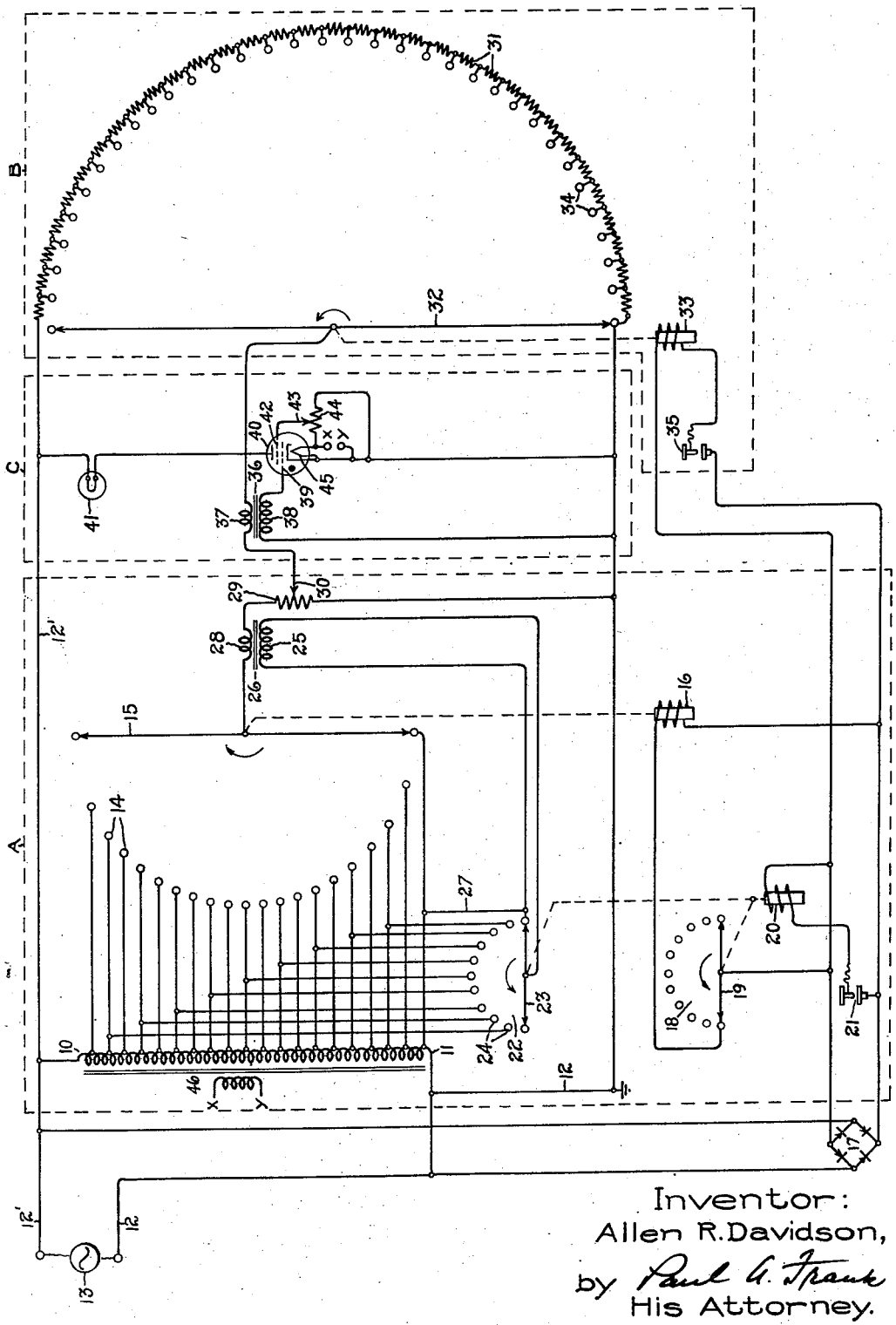
Inventor:
Allen R. Davidson,
by Paul A. Frank
His Attorney.

Patented July 8, 1952

2,602,586

UNITED STATES PATENT OFFICE 2,602,586

QUALITY CONTROL INDICATOR

Allen R. Davidson, Erie, Pa., assignor to General Electric Company, a corporation of New York Application June 13, 1950, Serial No. 167,846

13 Claims. (Cl. 235—61)

My invention relates to quality monitoring devices and, more particularly, to devices for indicating an excessive number of defective units during the course of production of an article, the quality of which it is desired to monitor, or during the course of testing the quality of a large number of such articles.

During manufacture, a particular production element such as a machine, process or assembly line, may be turning out a product of generally acceptable quality, as evidenced by the production of only a relatively few units below a predetermined quality standard. In other words, the machine, process, or assembly line is considered to be "in control" if the number of sub-quality units is within a predetermined "reject rate" which is conventional in the particular production element involved; the term "reject rate" being employed to define the ratio of sub-quality units to the total number of units produced. However, in the course of time, production factors which are not readily apparent may adversely affect the quality of the units produced to raise the number of sub-quality units above the acceptable "reject rate" so that the production element is considered to be "out of control."

One of the principal difficulties which is encountered in providing a quality monitoring device for determining whether such production element is "in" or "out of" control, is that it is necessary to take into consideration the statistical fact that just because the inspection data on a few units indicates a total number of sub-quality units in excess of a predetermined monitoring rate at which the element is normally expected to run, this does not necessarily indicate that the element is "out of control." For example, if the monitoring reject rate is agreed to be 1%, four sub-quality units or "rejects" may be tolerated in the first one-hundred units tested, since under the so-called "law of probability" it is possible that even with a reject rate of 1%, occasionally four rejects would appear in the first one-hundred units tested. However, as the number of units tested increases, the tolerable reject rate continues to more closely approach the monitoring reject rate agreed upon, until they are theoretically equal at an infinite number of total units tested.

Accordingly, a principal object of my invention is to provide a quality monitoring device which will give an accurate indication of whether a production element is "in" or "out of" control.

In fulfillment of the above object, it is a further object of my invention to provide a quality monitoring device which indicates immediately when the number of sub-quality units produced exceeds the tolerable reject rate for any predetermined monitoring reject rate in accordance with the statistical law of probabilities.

In general, my invention provides a "total unit counting" voltage representing a continuous record of the total number of units tested, and a second or "total reject counting" voltage representing a continuous record of the total number of units rejected. A fraction of the total unit counting voltage corresponding to the monitoring reject rate agreed upon is compared with the total reject counting voltage, and means are provided for indicating an excess of the reject counting voltage over the total unit counting voltage fraction. However, in order to compensate for the varying tolerable limit of the monitoring reject rate as the number of tested units increases, the device is constructed so that the increment of increase in the total unit counting voltage is related to an increase in the total reject counting voltage in accordance with a predetermined mathematical function which represents the limit in the number of sub-quality units which may be tolerated for any instantaneous count of the total number of units inspected.

The novel features which I believe to be characteristic of my invention are set forth with particularity in the appended claims. My invention itself, however, together with further objects and advantages thereof may best be understood by reference to the following description taken in connection with the accompanying drawing in which the sole figure is a simplified schematic diagram of a preferred embodiment of my invention.

Referring to the drawing, I have shown my invention in simplified schematic form as comprising a total unit counting and fractioning network enclosed with a dashed line designated by the letter A, a total "reject" or sub-quality unit counting network enclosed within a dashed line designated by the letter B, and an overbalance indicating circuit enclosed within the dashed line designated by the letter C.

The total unit counting and fractioning network A provides a voltage which represents a predetermined fraction, depending upon the agreed or monitoring reject rate, of a continuous total unit counting voltage. A preferred circuit for this network includes an auto-transformer 10 having a multi-tapped primary winding 11 adapted to be connected through conductors 12 and 12' across an alternating voltage source 13.

Taps 14 of the auto-transformer 10, are equally spaced along the length of the winding 11 and may conveniently be 20 in number to provide 20 equal increments of increasing potential, each increment preferably corresponding to a count of a predetermined power of 10, such as 100, to give a total possible count of 20 times this power of 10, such as 2000, before the instrument need be reset. The terminations of taps 14 may conveniently be arranged in the form of a semicircle, as shown, and a double-ended contact arm 15 adapted to be rotated in steps by means of current pulses through an associated electromagnetic relay 16 to move from the lowest voltage tap to successive higher voltage taps in accordance with the count. The use of a double-ended contact arm 15, as shown, is to be preferred, since it eliminates the necessity of an additional contact arm resetting relay.

Direct current for energizing the contact arm motivating relay 16 is derived by such means as a connection across the direct current terminals of a bridge rectifier 17 whose alternating current terminals are connected to the alternating voltage supply conductors 12 and 12' respectively. The relay energizing circuit is completed through the final contact of a stepping switch 18, which preferably has 10 incremental positions of its contacting arm 19. A second electromagnetic relay 20 is connected to receive direct current from the bridge rectifier 17 whenever a series connected keying switch 21 is closed, and operates to propel the sequential rotational movement of the contact arm 19. The key 21 is arranged to be closed, either manually, as shown, or by known electronic circuits, after the inspection of each group of units totaling to a power of 10 which is one less than the power of 10 represented by the incremental voltage change between successive taps 14 of the auto-transformer winding 11. If, for example, the increase in voltage between successive taps 14 of the auto-transformer 10 represents a count of 100 units, then the keying switch 21 will be closed after the inspection of each group of 10 units. As a consequence, relay 16 will be energized only after a count of 100 units. It is evident, of course, that additional counting stages similar to the stage comprising relay 20 and stepping switch 18 may be incorporated into the counting system until each unit may be counted directly rather than in groups of some power of 10.

The voltage between the contact arm 15 of the auto-transformer 10 and a low or "grounded" side of the alternating voltage source, represented by conductor 12, will, therefore, vary in incremental steps in accordance with an incremental increase in the count of each higher power of 10, such as 100, units inspected. In order to provided a voltage representing a finer or "vernier-type" count of the units inspected, an additional lower voltage producing means is connected in series with this voltage at contact arm 15 and provides a voltage increasing in increments having a magnitude which is a power of 10 that is one less than the power represented by the voltage increment between successive taps of the auto-transformer 10. One convenient and accurate means for obtaining this vernier count comprises a second stepping switch 22 which is preferably a second level of the stepping switch 18, since the movement of its contact arm 23 may be energized together with the contact arm 19 of switch 18 by the relay 20, as shown. The contact points 24 of the switch 22 are respectively connected to every second tap along the length of the auto-transformer 10 to provide a total of 10 equal incremental voltage positions from one side of the switch 22 to the other. A primary winding 25 of a step-down transformer 26, which preferably has a turns ratio of 20 to 1, is connected to receive the voltage developed between the rotating arm 23 of the stepping switch 22 and its grounded contact point 27. The secondary winding 28 of the transformer 26 is connected in series between the contact arm 15 of the auto-transformer 10 and one side of a potentiometer 29 whose other side is connected to the grounded alternating voltage conductor 12. Because of the 20 to 1 step down turn ratio of transformer 26, the voltage increase induced in the secondary winding 28 by a movement of contact arm 23 from one contact point 24 to a succeeding point is $\frac{1}{20}$ of the voltage existing between every second successive tapped point of the auto-transformer. If, for example, the voltage between adjacent tapped points 14 of the auto-transformer 10 represents 100 units inspected, then the voltage between every second point represents 200 units; and the incremental voltage induced in the secondary of the transformer 26 represents $\frac{1}{20}$ of this latter voltage, or 10 units. It will thus be seen that a vernier counting voltage between 0 and 100 in steps of 10 is produced by the movement of a contacting arm 23 of the stepping switch 22.

The secondary winding 28 of the transformer 26 is connected in additive phase with relation to the voltage appearing at the movable arm 15 of the auto-transformer so that the alternating voltage supplied across the potentiometer 29 will be the sum thereof. A total voltage is, therefore, impressed across the potentiometer 29 which varies in small incremental steps in accordance with the total number of units inspected. It will be appreciated, however, that although I have shown a preferred series-connected step-down transformer means for obtaining a voltage representing a finer count of the total units inspected, other known means, such as a plurality of voltage dividing networks, may alternatively be employed. In fact, although considerably more expense would be involved, an auto-transformer having in the neighborhood of 100 or 200 taps, may, of course, be used in lieu of any such vernier count producing system.

Since the potentiometer 29 constitutes a voltage dividing network, the movable tap 30 of the potentiometer may be adjusted to supply to one side of the over-balanced indicating circuit C a predetermined fraction of this total unit counting voltage which corresponds to an agreed or monitoring reject rate which has been determined in accordance with previous history of the production process involved.

The total reject unit counting circuit B supplies a voltage to the other side of the over-balance indicating circuit C which represents a continuous count of the total number of sub-quality of "rejected" units among those inspected. Since the number of units rejected is normally only a small fraction of the total number of units inspected, a single-multi-tapped potentiometer or a plurality of about thirty-three impedance elements 31, as shown, connected in series between conductors 12 and 12', are usually sufficient for the purpose of providing this reject counting voltage. A rotatable contact arm 32 moves in steps under the influence of current pulses through an actuating relay 33 to successive points of connection 34 between these impedance elements 31. The flow of current through this relay 33 is, in turn, controlled by such means as a keying switch 35 which is connected in series with the relay 33 across the direct current terminals of the bridge rectifier 17. Keying switch 35 is closed whenever an inspected unit is considered to be below an acceptable quality level.

The over-balance indicating network or circuit C functions to compare the alternating voltage received from the total counting and fractionating network A with the voltage received from the reject counting network B, and provides a suitable indication whenever this latter voltage exceeds the former. Referring to the drawing, the over-balance circuit C comprises an input transformer 36 whose primary winding 37 is connected between the movable arm 30 of potentiometer 29 and the movable arm 32 of the reject unit counting network B. The voltage induced in a secondary winding 38 of the transformer 36 is supplied to a firing point controlling electrode 39 of a gas-filled electron discharge device 40. The cathode-to-anode circuit of the discharge device 40 is completed through an indicating lamp 41 by connection across the alternating voltage conductors 12 and 12'. The discharge device 40 is preferably of the type having an additional electrode 42 which increases the sensitivity of the control electrode 39 and which is energized by an alternating voltage in phase with the plate voltage by connection to a tap 43 of a potentiometer 44. The potentiometer 44 is, in turn, connected from one side of a filament 45 of the discharge device 40 to the grounded conductor 12. The proper phase relations are conveniently preserved by employing a secondary winding 46 of the auto-transformer 10 as the source of voltage for the filament 45, as indicated in the drawing by the corresponding letters X and Y.

The gas-filled discharge device 40, when connected in the above circuit, operates in a well-known manner to conduct a substantial amount of current during a portion of each positive alternation of source voltage, and thereby functions to light lamp 41 whenever an alternating voltage is supplied to the firing point controlling electrode 39 of the device 40 which is in phase with the source voltage 13. Conversely, conduction of the discharge device 40 is prevented by a 180 degree out-of-phase control electrode voltage. The phase of the voltage induced in the secondary winding 38 of the transformer 36 depends upon the direction of current flow through the primary winding 37 which, in turn, depends upon the relative magnitudes of the voltages received from the total unit counting network A and the reject unit counting network 3. Consequently, the transformer 36 may be connected to cause lamp 41 to light whenever the voltage at the movable arm 32 of the reject unit counting network B exceeds the voltage at the movable arm 30 of potentiometer 29 of the total unit counting network A, and thereby to indicate that the production element is "out-of-control." On the other hand, the transformer 36 may be reversely connected in order to light the lamp 41 upon an opposite over-balance condition to indicate that the production element is "in control." The high sensitivity of such gas-filled electron discharge devices 40 assures a positive action when the over-balanced condition is reached. Other polarity-sensitive over-balance indicators, such as those employing simple electromagnetic relays, may alternatively be used, but such circuits are generally less sensitive than the above-described circuit.

In order to enable the above-described quality control monitor to reflect accurately, the tolerable limits in the number of sub-quality units as the total number of units inspected keeps increasing, the voltage increments produced by at least one side of this balancing "bridge-type" network must vary in a non-linear manner. In the preferred embodiment of my invention illustrated by the drawing, the impedance elements of the reject counting network B are relatively proportioned so that the voltage produced between the movable arm 32 and the grounded conductor 12 does not rise in linear increments as the arm moves from one contacting point to the next, but rather rises in accordance with values derived from the following mathematical expression which represents the tolerable limits in the number of sub-quality units as the total count is increased.

$$N = np + X\sqrt{np(1-p)} \qquad (1)$$

where

N represents the number of tolerable defective units.

$n$ represents the total number of units tested.

$p$ represents the monitoring reject rate agreed upon or set for the particular process involved.

X represents the number of "standard deviations" used.

The term "standard deviation" herein employed is well known in the science of statistics and is a measure of the spread of readings around the average value. Thus, it is a unit in terms of which the probability of occurrence of an observed value differing from the mean by more than a specified amount may be given. It has become the convention in American industry to work with limits of 3 standard deviations, and it may be shown that if the process is "in control" the reading observed will differ from the expected reading by more than 3 standard deviations less than 12% of the time in any event and generally less than 1% of the time. Thus, the chance for erroneously calling the process out of control is negligible.

Since $p$ is a small number, the above expression (1) may be reduced to the following relationship which provides a close practical approximation thereof:

$$N = np + X\sqrt{np} \qquad (2)$$

Furthermore, since X is a constant, it will be seen that N (which is a measure of whether the line is "in" or "out" of control) is a determinable function of the quantity $np$ (which represents the agreed monitoring reject rate fraction of the total units counted).

It will be appreciated that as the total count $n$ increases the magnitude of the second term $$X\sqrt{np}$$

does not increase at the same rate as the first term $np$. Hence, on a percentage basis, the term $$X\sqrt{np}$$

gradually becomes less important and the term $np$ becomes the predominant factor in determining the number of sub-quality units tolerable. Therefore, with a sufficiently large total count $n$ the indication of whether the line is in control becomes substantially dependent upon the product $np$ alone.

Therefore, since the voltage supplied to the over-balance indicating circuit C from potentiometer 29 is proportional to $np$, it is only necessary to proportion the impedance elements 31 of the reject unit counting network B in accordance with the function of N derived from the related expression:

$$np + X\sqrt{np}$$

If, for example, X is taken as 3, the voltage steps supplied to the over-balance circuit C from the reject counting network B must be proportional to the quantity:

$$4.5 + N - 1.5\sqrt{9 + 4N}$$

This quantity is obtained by assuming the output voltage of the reject counting network B equal to $np$ (which is true for the threshold of the over-balance condition) and solving the equation for $np$ in terms of N.

Typical values which have been found to be suitable for a bank of thirty-three impedance elements 31 connected in series from conductor 12 to conductor 12' for the condition where X equals 3 are as follows:

| | Ohms | | Ohms |
|---|---|---|---|
| R1 | 16.33 | R18 | 123.3 |
| R2 | 42.66 | R19 | 123.3 |
| R3 | 56.33 | R20 | 126.6 |
| R4 | 70 | R21 | 130 |
| R5 | 76 | R22 | 130 |
| R6 | 85.3 | R23 | 130 |
| R7 | 91.66 | R24 | 130 |
| R8 | 94.66 | R25 | 130 |
| R9 | 97.66 | R26 | 130 |
| R10 | 102.3 | R27 | 130 |
| R11 | 102.3 | R28 | 132 |
| R12 | 111 | R29 | 133.3 |
| R13 | 111 | R30 | 133.3 |
| R14 | 113.6 | R31 | 136 |
| R15 | 114.6 | R32 | 140 |
| R16 | 116.6 | R33 | 180 |
| R17 | 120 | | |

Although I have shown the reject counting network B as producing non-linear voltage increments in accordance with the above mathematical relationship, the total unit counting network A or, in fact, both counting networks A and B may alternatively be constructed to be non-linear in accordance with this mathematical relationship. For example, the impedance elements 31 providing the voltage steps of the reject unit counting network could all be the same, but then the tapped points along the length of the auto-transformer 10 would not be equidistant. Rather, they would be determined by solving the equation, $$N = np + X\sqrt{np}$$

for N in terms of $np$ rather than vice versa, as described above.

Moreover, it will be appreciated that my invention may be easily adapted by those skilled in the art to a unidirectional voltage source by substituting a multi-tapped potentiometer for the auto-transformer 10, and by the substitution of other direct current responsive over-balance indicating means, such as a simple electromagnetic relay circuit or a meter, preferably of the null deflection type, for the alternating current indicating over-balance circuit C shown in the diagram.

Many other modifications of my invention will obviously occur to those skilled in the art. It is to be understood, therefore, that I intend by the appended claims to cover all such modifications as fall within the true spirit and scope of my invention.

What I claim as new and desire to secure by Letters Patent of the United States is:

1. A quality monitoring device for providing a continuous indication of whether an excessive number of sub-quality units exists among a continuing total number of units inspected comprising means having two input terminals for indicating an excess of voltage supplied to one terminal over that supplied to the other thereof, an electric counting and fractioning means operative in response to a continuing count of a total number of units inspected and connected to supply a predetermined fraction of a voltage representing said total unit count to one terminal of said indicating means, and a second electric counting means operative in response to a continuing count of a total number of sub-quality units among those inspected and connected to supply a voltage representing said total sub-quality unit count to the other terminal of said indicating means, each electric counting means being constructed to supply voltages to said indicating means which increase in predetermined relation to the voltage supplied thereto by the other electric counting means, said relationship representing the limit in the number of sub-quality units tolerable for any instantaneous total count.

2. A quality monitoring device for providing a continuous indication of whether an excessive number of sub-quality units exists among a continuing total number of units inspected comprising a first electric counting means for providing a total inspected unit counting voltage, means having two input terminals for indicating the relative preponderance in the magnitude of voltages supplied to each of said terminals, voltage dividing means connected to receive said total unit counting voltage and to supply a fraction thereof to one terminal of said indicating means, and a second electric counting means connected to supply a total sub-quality unit counting voltage to the other terminal of said indicating means, said second electric counting means being constructed to provide a total sub-quality unit counting voltage which is related to said total inspected unit counting voltage in accordance with a predetermined mathematical expression representing the limit in the number of sub-quality units tolerable for any predetermined fraction of any instantaneous total count.

3. A quality monitoring device comprising a first electric counting means operative in response to a continuing count of a total number of units inspected for providing a total unit counting voltage increasing in linear increments in accordance with said total unit count, means having two input circuits for indicating an excess of voltage supplied to one input circuit over that supplied to the other thereof, voltage dividing means connected to receive said total unit counting voltage and to supply a predetermined fraction thereof to one input circuit of said indicating means, and a second electric counting means operative in response to a continuing count of a total number of sub-quality units among those inspected and connected to supply a total sub-quality unit counting voltage to the other input circuit of said indicating means, said second counting circuit being constructed to provide a total sub-quality counting voltage which increases with said sub-quality unit count in accordance with a predetermined mathematical function of said total unit count voltage representing the tolerable limit in the number of sub-quality units for said predetermined fraction of any instantaneous total count.

4. A quality control monitor for providing a continuous indication of whether an excessive number of sub-quality units exists among a continuing total number of units inspected comprising a voltage source, a first voltage dividing means connected across said voltage source providing a plurality of voltages increasing in linear increments, a first switching means for sequentially selecting said increasing voltages in response to a continuing count of a total number of units inspected, a voltage over-balance indicating network having two input terminals and means for indicating an excess of voltage supplied to one terminal over that supplied to the other thereof, a second voltage dividing means connected to receive said voltages selected by said first switching means and to supply a predetermined fraction thereof to one of said terminals, a third voltage dividing means connected across said voltage source providing a plurality of voltages increasing in accordance with a predetermined mathematical relationship of said total unit counting voltage, said relationship representing the tolerable limits of the number of sub-quality units for any instantaneous total count, and a second switching means for selectively supplying sequentially said latter increasing voltages to the other of said terminals in response to a total continuing count of the sub-quality units among those inspected.

5. In a quality monitoring device the combination comprising a voltage source, a pair of impedances connected in parallel across said source each having a plurality of taps along the length thereof and each having a movable contact arm for sequentially selecting the voltage between said taps and one side of said voltage source, a voltage dividing network connected between one contact arm and said one side for providing a predetermined fraction of the voltage selected by said one contact arm, and voltage over-balance indicating means connected to receive both the voltage fraction provided by said voltage dividing network and the voltage at the other contact arm for indicating the relative preponderance of said received voltage magnitudes, one of said impedances being constructed to have equal impedance increments between adjacent taps and the other of said impedances being constructed to have impedance increments between adjacent taps which are proportioned in accordance with a predetermined mathematical expression representing the number of sub-quality units tolerable for any instantaneous count of a total number of units whose quality is to be monitored and for a monitoring reject rate represented by the predetermined voltage fraction provided by said voltage dividing network.

6. A quality monitoring device for providing a continuous indication of whether an excessive number of sub-quality units exists among a continuing number of units inspected comprising a voltage source, a first impedance connected across said source having a plurality of spaced taps along the length thereof and having a movable contact arm arranged to select sequentially increasing voltages between successive ones of said taps and one side of said voltage source, said voltages representing a running count of a total number of units inspected, a potentiometer connected between said movable arm and said one side having an adjustable tap for deriving a predetermined fraction of said selected voltages which represents an agreed monitoring reject rate, and a second impedance connected across said voltage source having a plurality of spaced taps along the length thereof and having a movable contact arm arranged to select sequentially increasing voltages between successive ones of said latter taps and said one side of said voltage source, said latter voltages representing a running count of the number of sub-quality units among those inspected, the impedance increments between adjacent taps of said second impedance being proportioned to provide voltage increments increasing in a predetermined relationship to the voltage increments provided by said first tapped impedance, said relationship being determined by the tolerable limits in the number of sub-quality units permissible for any fraction of any instantaneous count of the total number of units inspected, and voltage over-balance indicating means connected between the movable arm of said potentiometer and the movable arm of said second impedance for indicating the relative preponderance of voltage magnitudes at said last-mentioned movable arms.

7. A quality monitoring device comprising an alternating voltage source, an auto-transformer connected across said voltage source having a plurality of spaced taps and a movable contact arm arranged to select sequentially increasing voltages between successive ones of said taps and one side of said voltage source, a potentiometer connected between said movable arm and said one side having an adjustable tap for deriving a predetermined fraction of said selected voltages, a plurality of impedance elements connected in series across said alternating voltage source, switching means constructed and arranged to select sequentially increasing voltages between said one side and successive points of connection between said impedance elements, a voltage over-balance indicating circuit comprising a multi-electrode gas filled electron discharge device connected in series with an indicating load device across said alternating voltage source, and means operative in response to an excess of the voltage selected by said switching means over the voltage derived from said potentiometer for energizing electric current conduction through said discharge device.

8. In a quality monitoring device, an electric counting circuit for providing an electric voltage varying in accordance with a continuing total number of units inspected comprising an alternating voltage source, an auto-transformer connected across said source having a plurality of equally spaced taps and having a movable contact arm arranged to select sequentially increasing voltages between successive ones of said taps and one side of said voltage source, a stepping switch arranged to make contact to successive terminals of said switch each terminal being interconnected to a respective equally spaced one of said taps, and a transformer having a primary winding connected to receive the voltage from said stepping switch at each position thereof and having a secondary winding connected in series circuit relation from said movable arm of said auto-transformer to said one side of said voltage source, said transformer having a turns ratio proportioned to provide an incremental voltage induced in said secondary winding by each successive position of said switching means which is a predetermined fraction of the incremental voltage produced between the movable arm of said auto-transformer and said one side as it moves from one of said auto-transformer taps to a succeeding tap.

9. In a quality monitoring device the combination comprising a source of voltage, two banks of series connected impedance elements connected in parallel across said voltage source, each of said impedance banks having a movable contact arm for sequentially selecting the voltage between one side of said voltage source and successive points of connection between said series connected impedance elements, one of said impedance banks being constructed of impedance elements having equal value and providing a voltage representing a continuing count of a total number of units inspected, a voltage dividing network connected between the contact arm of said latter bank of impedances and said one side for providing a predetermined fraction of said total unit counting voltage, said fraction representing a monitoring reject rate for said device, and voltage overbalance indicating means connected to receive both the voltage fraction provided by said voltage dividing network and the voltage provided at the contact arm of the other bank of impedances for indicating an excess of voltage at said contact arm over said voltage fraction, said other bank of impedances providing a voltage representing a count of the sub-quality units among those inspected and being constructed of impedance elements proportioned to provide a voltage increment related to the voltage increment provided by said one impedance bank in accordance with a mathematical relationship representing the tolerable limits in the number of sub-quality units for any instantaneous count of total units inspected.

10. The quality monitoring device of claim 1 wherein the predetermined relationship of voltages provided by said electric counting means is derived from the expression:

$$N = np + X\sqrt{np}$$

where

N represents the number of tolerable sub-quality units n represents the total number of units inspected p represents a predetermined monitoring reject rate X represents the number of standard deviations used.

11. The quality monitoring device of claim 1 wherein the predetermined relationship of voltages provided by said electric counting means is derived from the expression:

$$N = np + 3\sqrt{np}$$

where

N represents the number of tolerable sub-quality units n represents the total number of units inspected p represents a predetermined monitoring reject rate.

12. The quality monitoring device of claim 2 wherein the predetermined mathematical expression comprises:

$$N = np + X\sqrt{np}$$

where

N represents the number of tolerable sub-quality units n represents the total number of units inspected p represents a predetermined monitoring reject rate.

X represents the number of standard deviations used.

13. The quality monitoring device of claim 2 wherein the predetermined mathematical expression comprises:

$$N = np + 3\sqrt{np}$$

where

N represents the number of tolerable sub-quality units n represents the total number of units inspected p represents a predetermined monitoring reject rate.

ALLEN R. DAVIDSON.

No references cited.